(12) United States Patent
Takagi et al.

(10) Patent No.: US 7,321,439 B2
(45) Date of Patent: Jan. 22, 2008

(54) INFORMATION PROCESSING APPARATUS AND METHOD FOR PROCESSING EXTERNALLY TRANSMITTED DATA, AND INFORMATION PROCESSING PROGRAM

(75) Inventors: Eiichi Takagi, Kanagawa (JP); Tsutomu Inose, Kanagawa (JP); Haruhisa Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 10/184,937

(22) Filed: Jul. 1, 2002

(65) Prior Publication Data
US 2003/0016387 A1    Jan. 23, 2003

(30) Foreign Application Priority Data
Jul. 5, 2001  (JP) .............................. 2001-204797
Jul. 5, 2001  (JP) .............................. 2001-204799

(51) Int. Cl.
G06F 3/12    (2006.01)
G06K 15/00    (2006.01)

(52) U.S. Cl. ..................... 358/1.15; 358/1.13; 358/1.18

(58) Field of Classification Search ............... 358/1.16, 358/1.17, 402, 403, 404, 1.15, 1.13, 1.18, 358/1.1, 468, 444; 707/10, 104.1
See application file for complete search history.

(56) References Cited

U.S. PATENT DOCUMENTS

| | | | | |
|---|---|---|---|---|
| 5,870,767 A | | 2/1999 | Kraft, IV | 707/501 |
| 6,029,182 A | * | 2/2000 | Nehab et al. | 715/523 |
| 6,222,634 B1 | | 4/2001 | Dubbels et al. | 358/1.15 |
| 6,348,970 B1 | * | 2/2002 | Marx | 358/1.15 |
| 6,775,026 B1 | * | 8/2004 | Kato | 358/1.15 |
| 6,938,202 B1 | * | 8/2005 | Matsubayashi et al. | 715/501.1 |
| 7,050,192 B2 | * | 5/2006 | Shima | 358/1.18 |
| 2001/0014902 A1 | | 8/2001 | Hu et al. | 707/540 |
| 2002/0091529 A1 | * | 7/2002 | Whitham | 704/275 |
| 2003/0007174 A1 | * | 1/2003 | Takagi et al. | 358/1.15 |

FOREIGN PATENT DOCUMENTS

| | | |
|---|---|---|
| EP | 0 964 339 | 12/1999 |
| JP | 10-162030 | 6/1998 |
| JP | 11-237968 | 8/1999 |

OTHER PUBLICATIONS http://www.microsoft.com/technet/prodtechnol/windows2000serv/support/c16w2kad.mspx#XSLTsection123121120120.*
http://www.webreference.com/js/tips/991029.html.*

* cited by examiner

*Primary Examiner*—Dov Popovici
(74) *Attorney, Agent, or Firm*—Fitzpatrick, Cella, Harper & Scinto

(57) ABSTRACT

An online print system including a server and a print apparatus capable of communicating with the server via the Internet is provided. The print apparatus receives display page data from the server, analyzes the display page data and requests the server to print the display page data in accordance with link information included in the display page data. The server obtains the print page data using the link information, forms an index file including information indicating outlines of respective pages of the print page data, and transmits the index file to the print apparatus. The print apparatus receives the index file together with the print page data from the server apparatus and displays the index file. A page to be subjected to printing is designated on the basis of the displayed index file and the designated page is printed on the basis of the print page data.

9 Claims, 13 Drawing Sheets

FIG. 5

`<a href="http://www.xxx.co.jp/next.htm">NEXT</a>`

FIG. 6

`<a href+"printto://222.xxx.co.jp/print.htm">PRINT</a>`

FIG. 7

`<a href="http://www.xxx.co.jp/print.htm" media="print">PRINT</a>`

FIG. 8
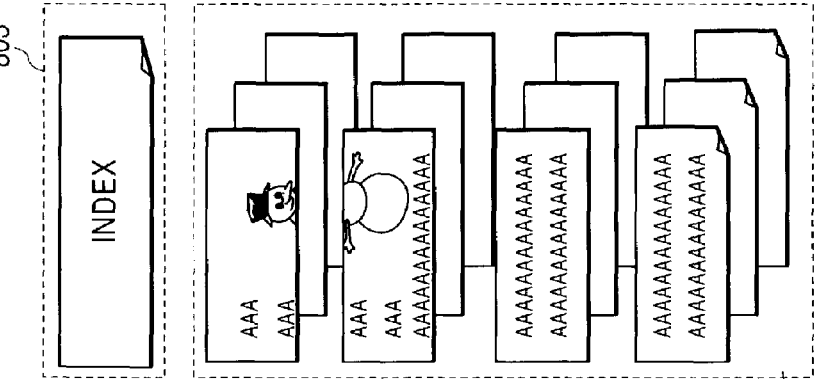
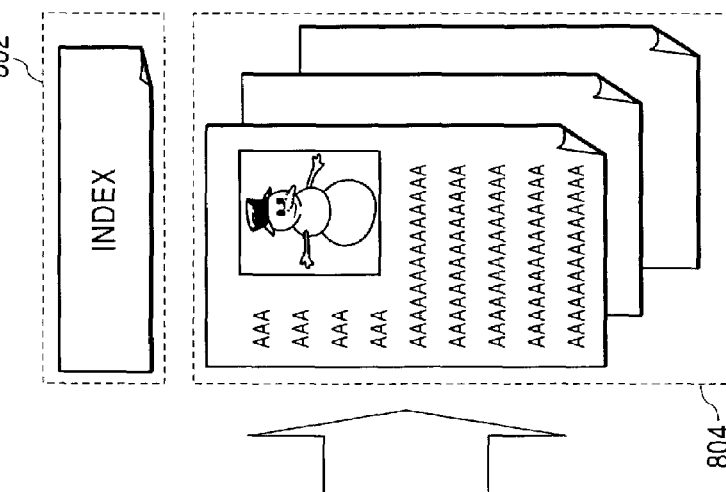
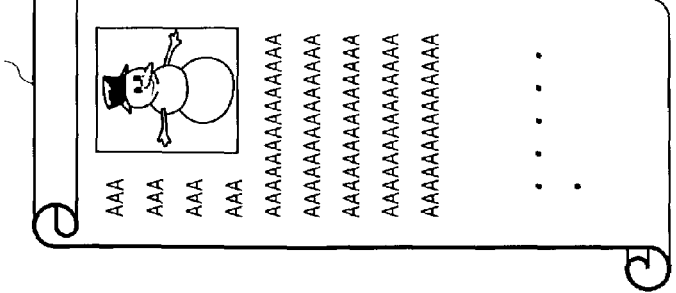

FIG. 9

```xml
<?xml version="1.0" encoding="Shift_JIS"?>
<!DOCTYPE pml PUBLIC"-//CAN//DTD PML DOCUMENT INFO V0.05//EN"">
<pml>
    <documentInfo paper="A4" scale="1" scaleFontSize="10pt" charactersPerLine="112"
        linesPerPage="72" baseFontSize="4" resolution="96" font="GOTHIC" />
    <printerProfile src="http://www.can.co.jp/IAPrinting/B850.xml" />
    <index totalPage="2">
        <indexPage no="1">
            <indexPageData title="MAP" src="http://www.can.co.jp/IAPrinting/93234343/Report_p1.xml" />
        </indexPage>
        <indexPage no="2">
            <indexPageData title="PRICE LIST" src="http://www.can.co.jp/IAPrinting/93234343/Report_p2.xml" />
        </indexPage>
    </index>
</pml>
```

INDEX INFORMATION

PAGE 1 : MAP

PAGE 2 : PRICE LIST

FIG. 14

```
1401
<html zmls:http//www.w3.org/TR/xhtml 1>
<body>
 ....
    <a href="www.can.co.jp/map.html"> MAP IS HERE </a>    1402
 ....
    <a href="www.can.co.jp/price.html"> PRICE LIST </a>   1403
 ....
</body>
</html>
```

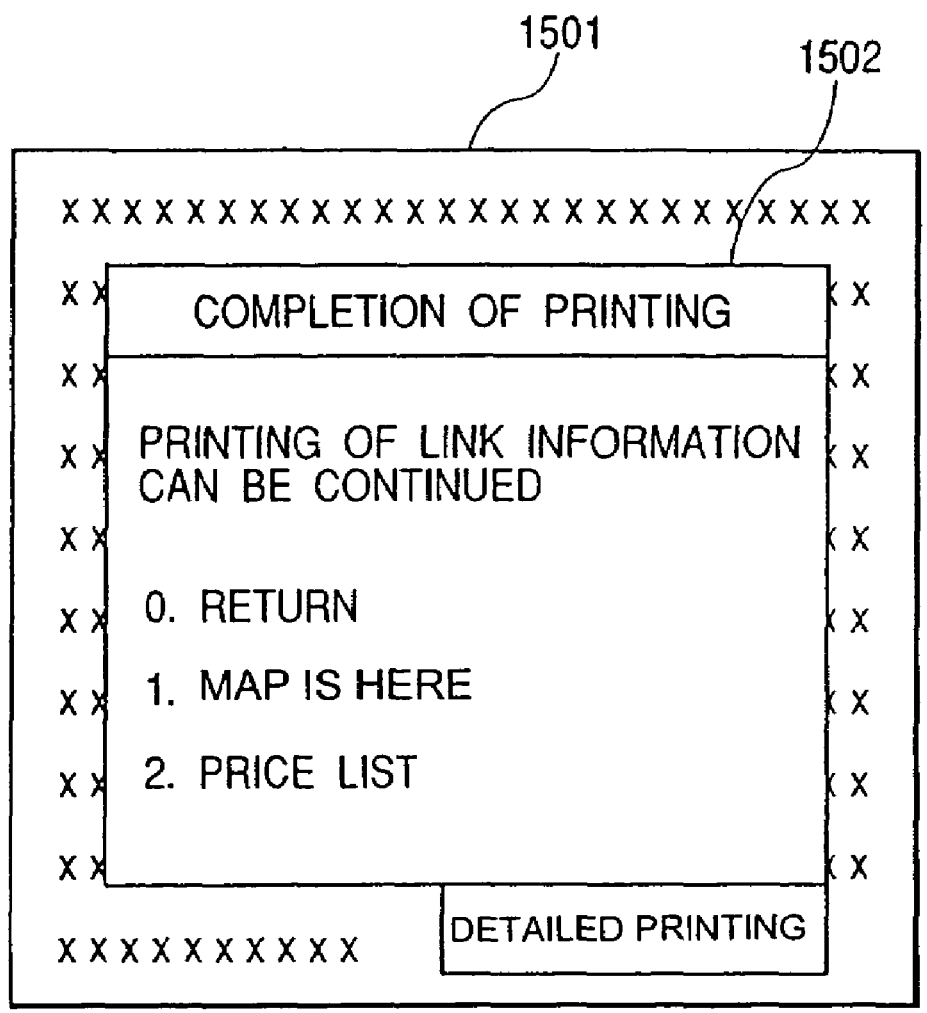

INFORMATION PROCESSING APPARATUS AND METHOD FOR PROCESSING EXTERNALLY TRANSMITTED DATA, AND INFORMATION PROCESSING PROGRAM

BACKGROUND OF THE INVENTION

1. Field of the Invention

The present invention relates to printing services carried out on Internet by a server/client system using an image processor capable of reading information on Internet, and printing information displayed by reading, for example a printer capable of displaying information of World Wide Web (WWW) described in Hyper Text Markup Language (HTML).

2. Related Background Art

Information services using display data described in a markup language in compact HTML, HDML or the like have been carried out for potable terminals (mobile terminals) such as cellular phones.

SUMMARY OF THE INVENTION

However, in the conventional method, information displayed on a portable terminal is simplified, and browsing software (referred to browser, hereinafter) can perform only simple operations because of constrains imposed on a device memory or the like.

By such a portable terminal, therefore, it has been impossible to view or obtain detailed information or meticulously designed content information to be read on a personal computer or the like. In the case of receiving desired homepage information to obtain printed information through FAX, communications with the browser must be stopped, and a new connection must be made to enable transmission/reception through FAX. In the case of using Internet FAX, exchanges must be carried out by transmitting/receiving mails. Because of no inter-service linkage between Internet FAX services and information services, operations have been complex, necessitating costly devices.

The present invention was made with the foregoing problems in mind, and designed to enable a printer to print a converted markup language by adding a description of a hyperlink (e.g., URL) with a print content to a display content for providing information (e.g., HTML data), and converting the print content into a markup language for printing by a server. Thus, the present invention enables a user to obtain detailed information by using a printer to be connected to a portable terminal such as a cellular phone, a FAX terminal or a telephone to print the information without using an expensive information processor such as a personal computer.

Moreover, a hyperlink to a print content can be further described in print data or a markup language for printing, enabling even data of a side to be linked to be continuously printed. Thus, to print a series of print contents, a user needs not enter URL many times, or obtain a display content again to issue printing instruction.

BRIEF DESCRIPTION OF THE DRAWINGS

FIG. 5 is a view showing a link description example of a service content.

FIG. 6 is a view showing a link description example of a print content.

FIG. 7 is a view showing a link description example of a print content.

FIG. 8 is a view showing print data.

FIG. 9 is a view showing an index portion of the print data.

FIG. 10 is a view showing a content display example of the index portion.

FIG. 14 is a view showing a data portion.

FIG. 15 is a view showing a display example of a list of link information.

DETAILED DESCRIPTION OF THE PREFERRED EMBODIMENT

Figure 1:
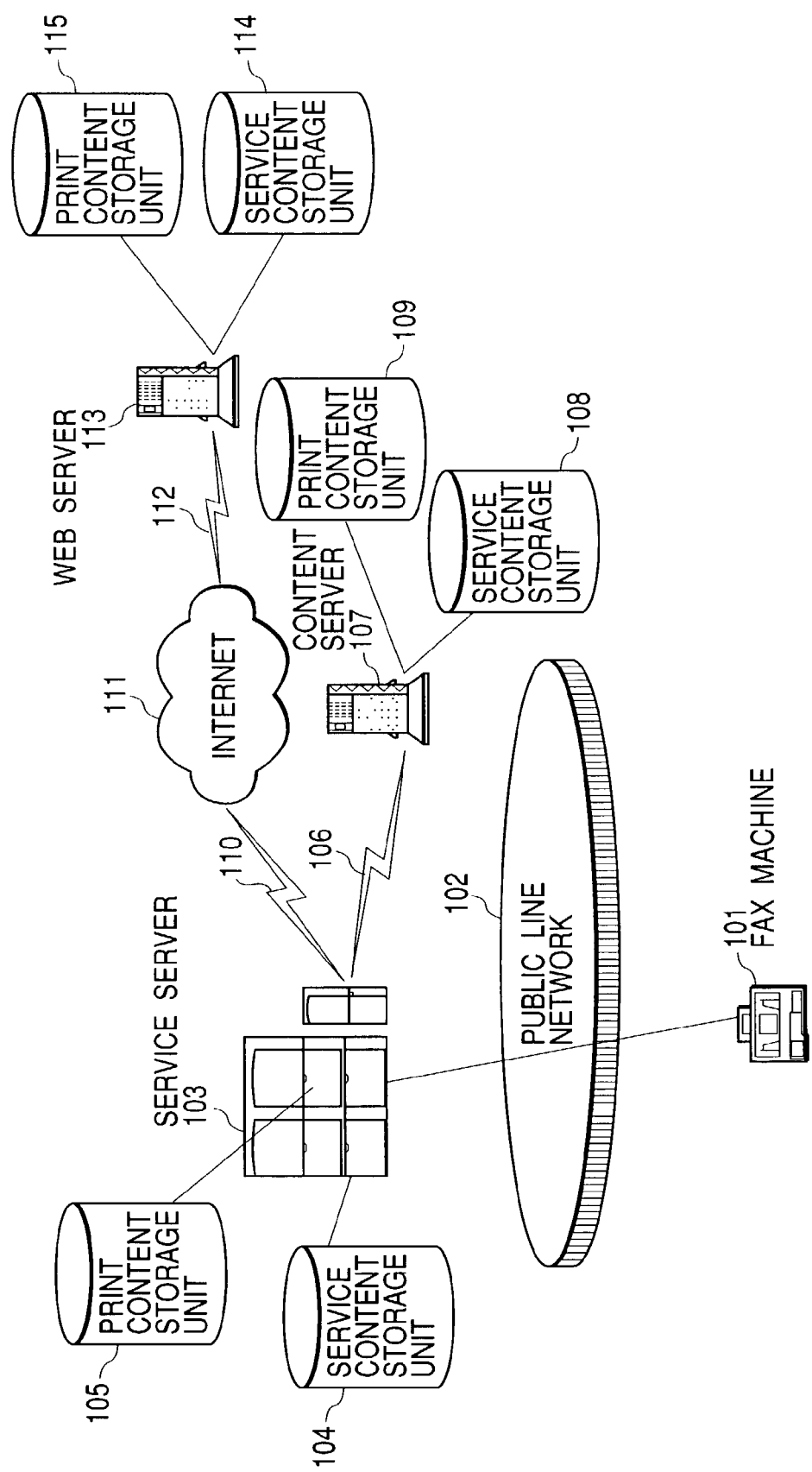
FIG. 1 is a view showing a configuration of a system for providing services.

FIG. 1 shows a service system of the present invention. In the drawing, a reference numeral 101 denotes a telephone having a FAX function (referred to as FAX machine, hereinafter) responsive to services, 102 a public line network, 103 a service server for providing the services to the telephone, 104 a storage unit for storing service contents of the provided services, which can be accessed by the service server 103, 105 a print content storage unit for storing print contents different from those to be accessed by the service server 103, and 106 an exclusive line, to which the service server 103 is connected.

The service content is a generic term for various bits of information provided by the services, which are processed and displayed by the telephone responsive to the services. Examples are HTML data described in HTML, image data of a JPEG form, a BITMAP form or the like, and character data of a TEXT form, and the like. The print content means information for printing corresponding to the service content. Based on this information, highly detailed and clear printing can be carried out. Examples are data described in a markup language for printing, and the like. Such a print content is converted into print data described in a print description language or a page description language, or print data such as bitmap image data, and used for printing.

A reference numeral 107 denotes a content server connected to the exclusive line 106 to communicate with the service server 103, 108 a service content storage unit for storing service contents to be accessed by the content server 107, 109 a print content storage unit for storing print contents to be accessed by the content server, and 111 Internet. Through Internet 110, the service server 103, the content server 107, and a Web server 113 can communicate with one another.

The Web server 113 provides service contents corresponding to homepages, which enable the portable terminal, the service responsive telephone or the like to read the homepages. A reference numeral 114 denotes a service content storage unit for storing service contents to be accessed by the Web server, and 115 a print content storage unit for storing print contents to be accessed by the Web server.

Hereinafter, the FAX machine 101 of the present invention is described with reference to the drawings. The present invention is not limited to the facsimile machine, and it can be applied to a portable terminal and a cellular phone to which a printer can be connected, and other office automation equipments such as a copying machine, a laser beam printer, and an ink jet printer.

Figure 11:
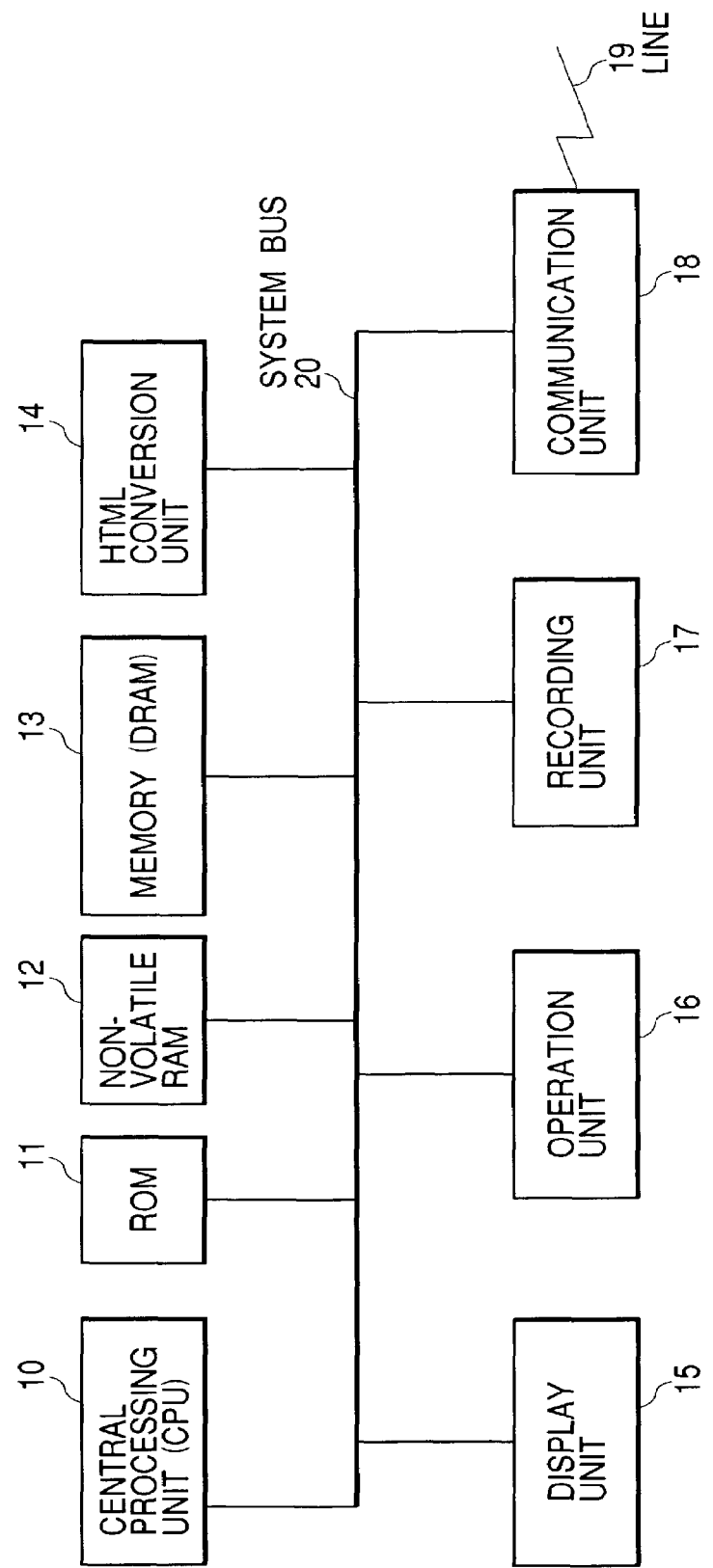
FIG. 11 is a configuration view of a FAX machine.

FIG. 11 is a configuration view showing a configuration example of the FAX machine 101. In FIG. 11, a reference numeral 10 denotes a central processing unit (CPU) for controlling an entire apparatus, 11 a ROM for storing programs and data, 12 a nonvolatile RAM for storing personal data, and backup data of a telephone directory or the like, and 13 a memory (DRAM) for storing CPU data (data used during execution of processing by CPU), HTML data, display data, recording data and the like. Processing executed by the FAX machine 101 is controlled by execution of the programs stored in the ROM 11 or the DRAM 13 by the CPU 10.

A reference numeral 14 denotes an HTML conversion unit for analyzing HTML data received through the Internet, dividing the data into image data, text data and the like, and converting the divided data into display data or recording data. The HTML conversion unit 14 analyzes HTML data, obtains linked image data therefrom when necessary, and generates display data or recording data.

A reference numeral 15 denotes a display unit for displaying a content of received data, a state of the apparatus, and the like, 16 an operation unit including ten keys, and 18 a communication unit including a modem for communications with external units through a telephone line 19. These processing units are interconnected through a system bus 20.

A reference numeral 17 denotes a recording unit (printing unit) such as a printer for printing images, texts or the like on a recording sheet based on image data or text data. The recording unit (printing unit) may be an ink jet printer, a laser beam printer or the like. The recording unit (printing unit) may be detachable. In such a case, it is connected through a predetermined cable or radio communications.

Figure 12:
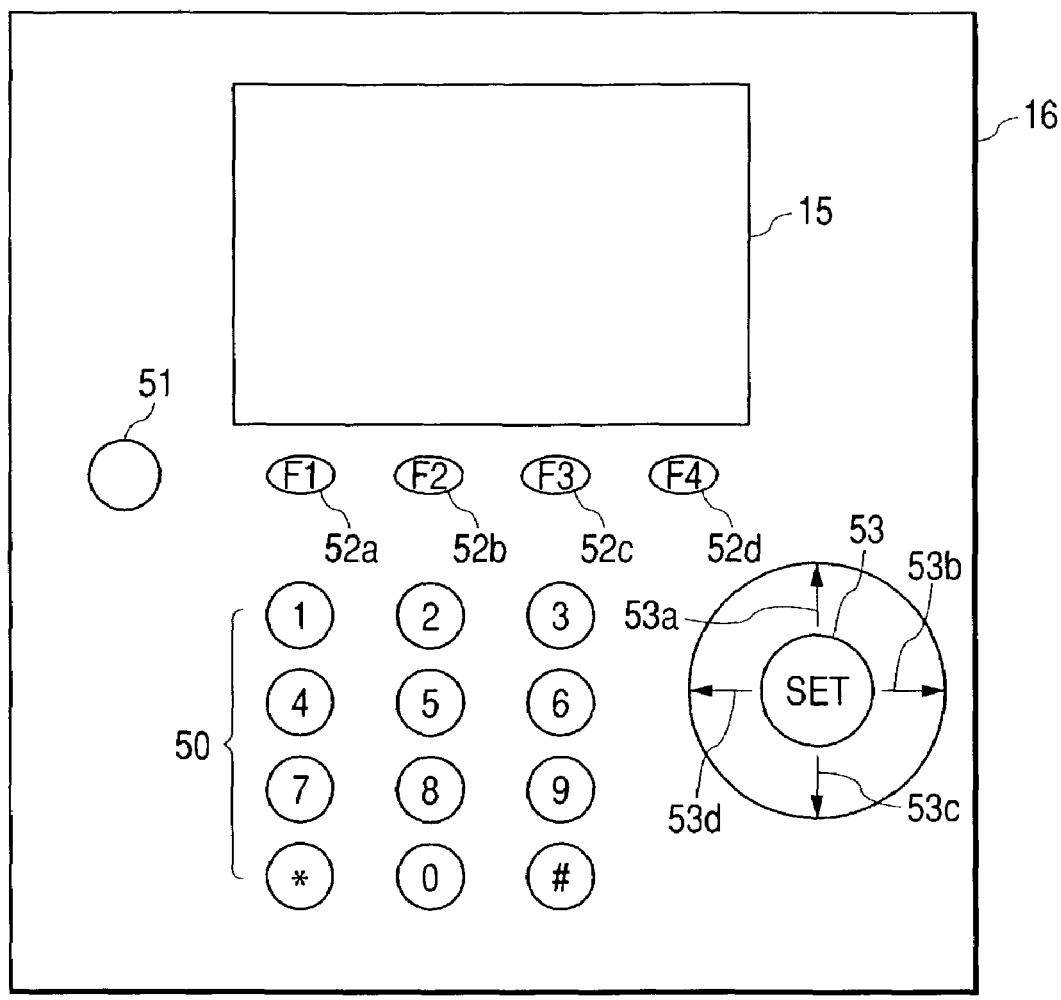
FIG. 12 is a configuration view of an operation unit.

FIG. 12 is a configuration view of the operation unit 16 of the apparatus. The operation unit 16 includes a display unit 15 such as an LCD, ten keys 50 for entering telephone numbers, URL or the like, an operation key 51 depressed to start function setting or the like, function keys 52a, 52b, 52c and 52d used for multiple entries, left-and-right, and up-and-down arrow keys 53a, 53b, 53c and 53d used for moving a cursor of the display unit, and a setting key 54 as a setting input key. The display unit 15 actually corresponds to a dot-matrix LCD.

Figure 2:
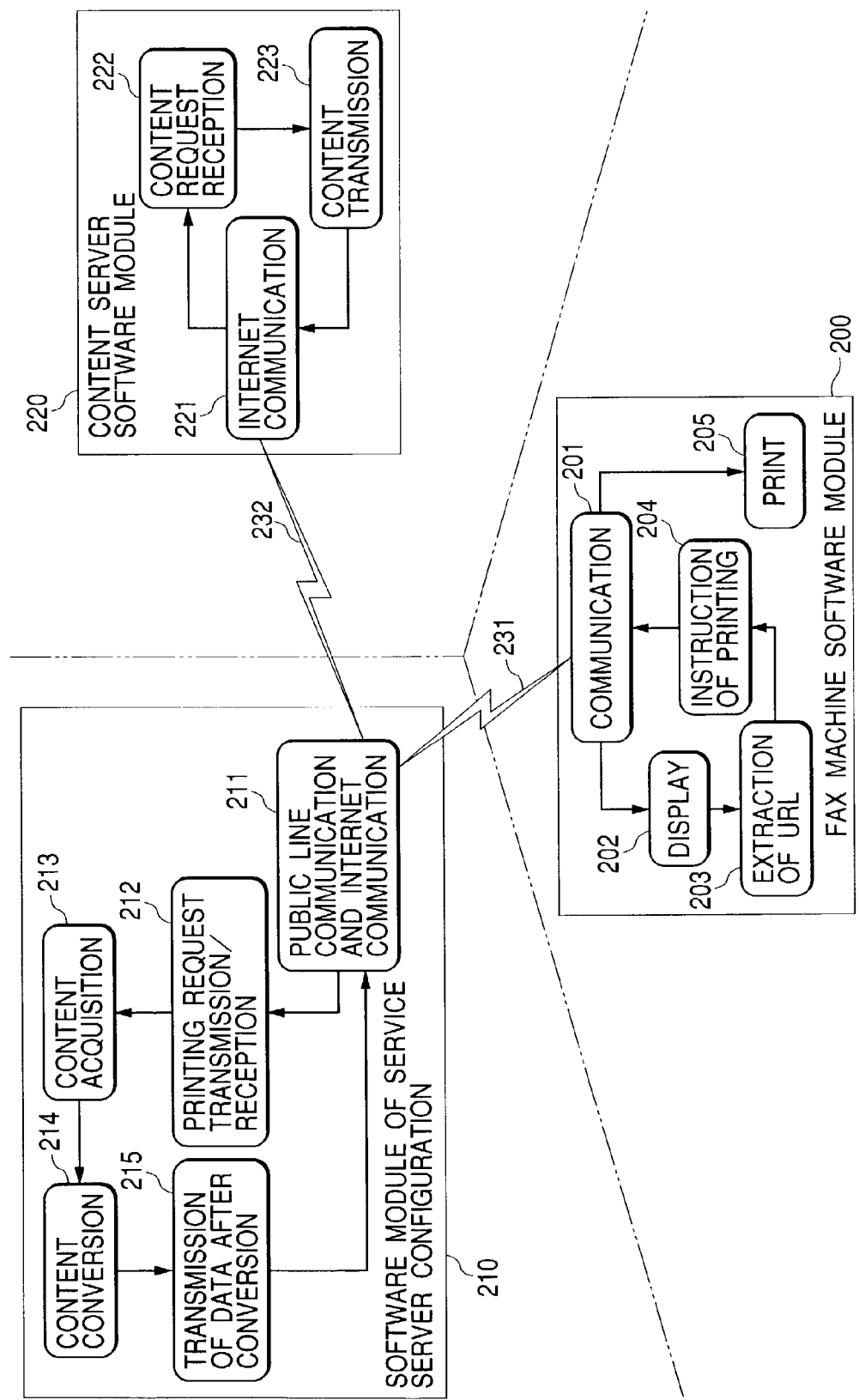
FIG. 2 is a view showing a software module necessary for services.

FIG. 2 shows a software module necessary for the described services. In FIG. 2, a reference numeral 200 denotes a software module group of the FAX machine 101, 201 a communication module for communicating with the service server 103 through a public line network, 202 a display module for displaying received service contents on the display unit, and 203 a uniform resource locator (URL) extraction module for extracting a URL indicating a storage location of a print content among the service contents. By designating this URL, designated data can be received from a designated server. A reference numeral 204 denotes a printing instruction module for transmitting the extracted URL to the server to receive print data, 205 a print module for causing the printing unit to print the received print data, and 231 a public line network.

A reference numeral 210 denotes a software module group of the service server 103 for rendering services, 211 a communication module for communicating with the server (107 or 113) or a service responsive terminal device through a public line, an exclusive line or the Internet, 212 a reception module for receiving a request from the FAX machine 101, 213 an acquisition module for acquiring a request print content, 214 a conversion module for converting the acquired print content into print data, 215 a transmission module for transmitting the converted print data to the FAX machine 101, which has made the request, and 232 an exclusive line or Internet.

A reference numeral 220 denotes a software module group of the content server 107 or the Web server 113, 221 a communication module for communicating with the service server 103 through an exclusive line or the Internet, 222 a reception module for receiving a content request, and 223 a transmission module for transmitting a requested content.

Figure 3:
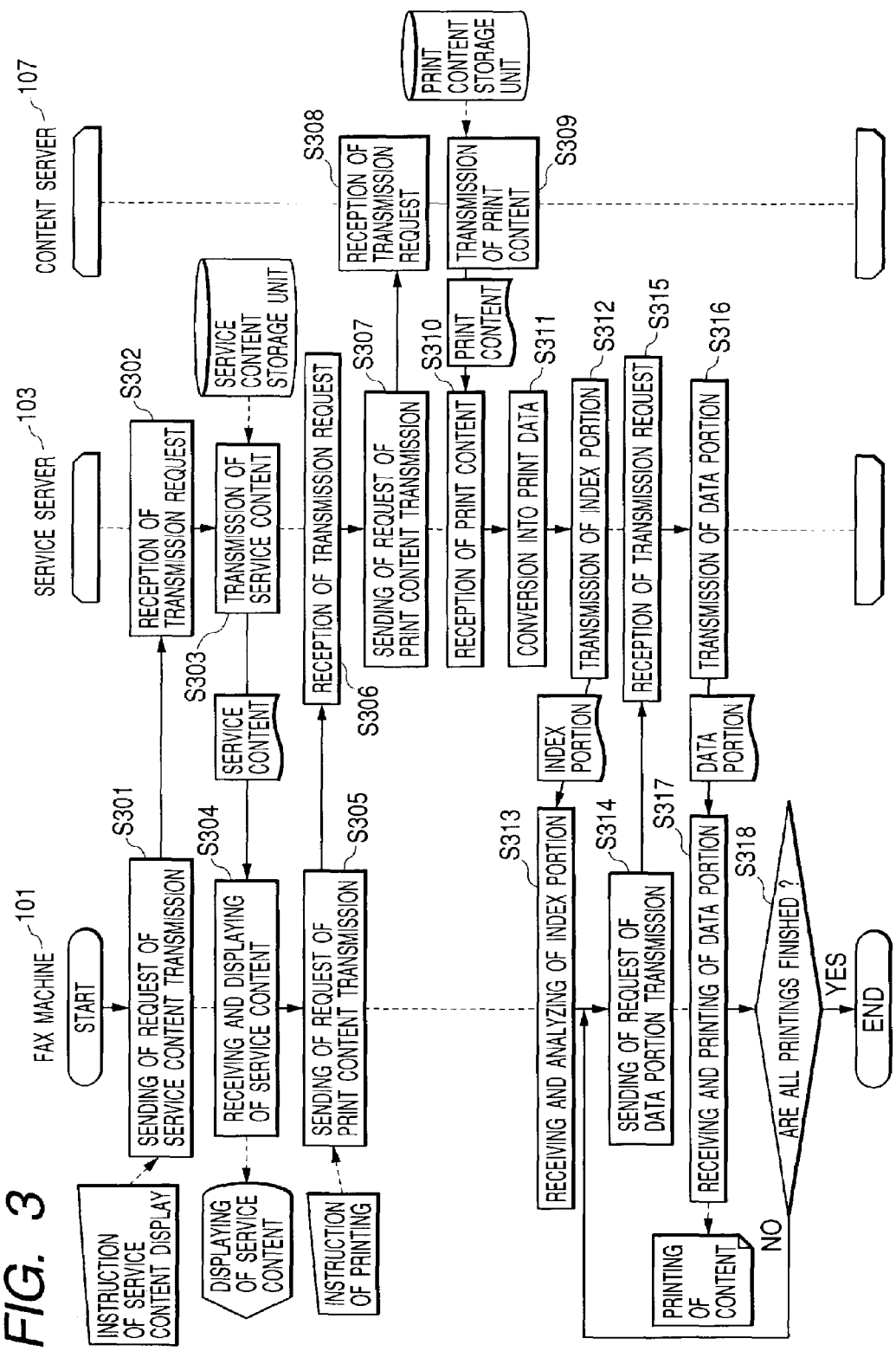
FIG. 3 is a flowchart showing a process carried out at each of a FAX machine, a service server, and a content server.

Regarding the system configured of the software modules shown in FIGS. 1 and 2, description is now made of an operation flow when a service content is located in the service server 103 and a print content is located in the content server 107. FIG. 3 is a flowchart showing a process carried out at each of the FAX machine 101, the service server 103 and the content server 107. An operation of the present invention is described by referring to this drawing.

In FIG. 3, steps S301, S304, S305, S313, S314, S317 and S318 are executed by the FAX machine 101, steps S302, S303, S306, S307, S310, S311, S312, S315 and S316 by the service server 203, and steps S308 and S309 by the content server 107.

First, when a user instructs starting of services, the FAX machine 101 connects with the service server 103, and then sends a request of service content transmission to the service server 103 (step 301). Upon reception of the transmission request from the FAX machine 101 (step S302), the service server 103 obtains a service content from the service content storage unit 104, and transmits the service content to the FAX machine 101 (step S303).

After having received the service content, the FAX machine 101 displays a content of the service content (step S304). In this case, the FAX machine 101 analyzes the service content, and displays an image, a character and the like on the display unit according to the content described therein.

Figure 4:
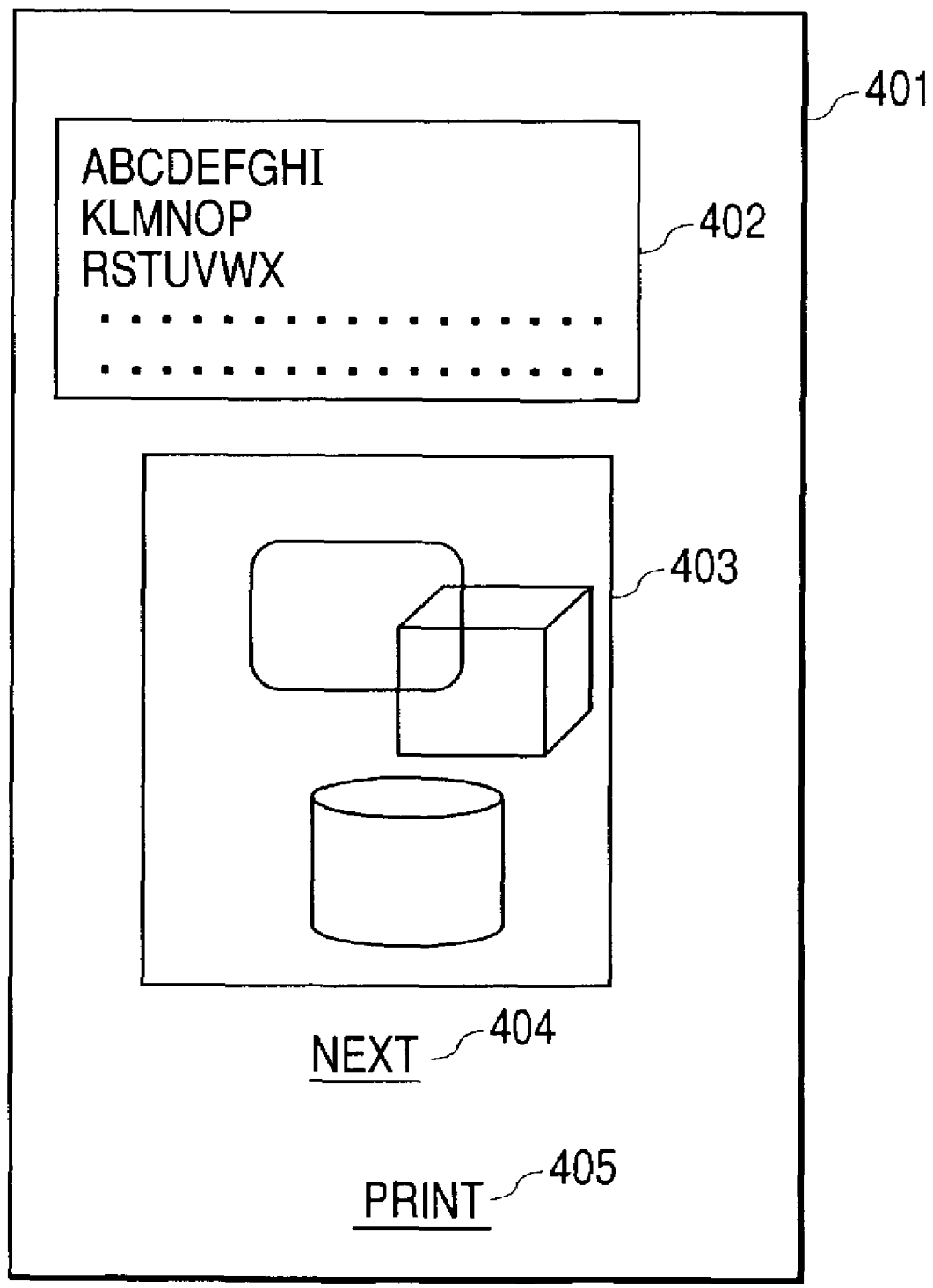
FIG. 4 is a view showing an example of display based on a service content described in HTML.

FIG. 4 shows an example of display based on a service content described, for example in HTML. A reference numeral 401 denotes a display screen of the FAX machine 101, 402 displays a sentence of a text form, and 403 an image based on image data.

A reference numeral 404 denotes a link to another service content. As URL corresponding to 404 is designated in the service content, when the user selects or designates 404, a new service content is obtained based on the designated URL. For example, assuming that there is a description similar to that shown in FIG. 5, when 404 is selected or designated, a request is made to the service server 103 to transmit a service content http://www. xxx. co. jp/next. html. Then, processing is carried out to display an obtained service content on the display unit.

A reference numeral 405 denotes a link to a print content. As URL corresponding to 405 in the service content is designated, when the user selects or designates 405, a print content is requested based on the designated URL, and converted print data is obtained from the print content. For example FIGS. 6 and 7 show description examples of links to print contents. If there is a description similar to that shown in FIG. 6, when 405 is selected or designated, a print content "printto://www. xxx. co. jp/print. html" is requested.

Alternatively, if there is a description similar to that shown in FIG. 7, a print content http://www. xxx. co. jp//print. html is requested.

The FAX machine requests a service content or a print content according to a content of a description. For example, in the case of FIG. 6, the FAX machine determines a link to a print content according to a description "printto". In the case of FIG. 7, the FAX machine determines a link to a print content according to a description "media="printto".

Now, when the user selects or designates a link on display, the FAX machine determines whether a selected link or a selected URL is a link to a print content or not. If it determines a link to the print content, the FAX machine requests a designated print content to the service server 103 (step S305).

Selection or designation of a link is decided in a manner that the user depresses the left-and-right and up-and-down arrow keys 53a, 53b, 53c and 53d to select one indicating a link on the display screen of the display unit 15, and decides the link by depressing the setting key 54. For example, the user may depress the left-and-right and up-and-down arrow keys 53a, 53b, 53c and 53d to move from one link to another, and decide a link to be selected by depressing the setting key 54.

In this case, the FAX machine 101 may issue a message, e.g., "IS PRINTING ALLOWED?", to the user, in order to reconfirm intention of printing. If a link to a service content is determined, then the process returns to step S301, where a service content is requested to the service server 103.

When the FAX machine requests a print content, the service server 103 receives a request of print content transmission (step S306). When it determines that the requested print content is located in the content server 107, the service server 103 requests a print content to the content server 107 (step S307).

The content server 103 receives a transmission request (step S308), and reads and transmits the requested print content from the print content storage unit 109 (step S309).

The service server 103 converts the received print content into print data to be printed by the FAX machine (step S311). The converted print data is expressed, for example in a form of an extensible markup language (XML), which includes a page structure of a print, an index portion adding simple explanation for each page, and a data portion indicating a content of the print. Such data after conversion may be described in a plurality of files.

FIG. 8 is a view illustrating the foregoing print data. A reference numeral 801 denotes HTML data described in HTML before conversion, and 802 and 803 index portions of print data expressed in an XML form. In each index portion, a page structure of a print, and simple explanation for each page are described.

A reference numeral 804 denotes a data portion of print data, which is divided for each page, and 805 similarly a data portion of print data, which is divided for each page and band. Such detailed division may be made. In the embodiment, it is assumed that a data portion is described in XHTML, and the FAX machine 101 can interpret and print data described in XHTML. The data portion needs only to be described in a data form to be interpreted and printed by the FAX machine 101, and it may be described in other XML forms such as SVG.

FIG. 9 is a view showing a description example of the index portion. A reference numeral 901 shows an example of an index file when the index portion is described in a file. The index file is described in an XML form as shown and, as information necessary for printing, a list of data for each page is described as a tag along with page information and printer information. The tag indicating each page includes attributes of URL for specifying a data portion (URL necessary for obtaining data equivalent to the data portion), and a title for simple explanation of a page.

A reference numeral 902 denotes a portion for describing the page information and the printer information. In FIG. 9, a sheet size if "A4", a scale "1", a size of a scale font "10 points", resolution "96 dpi", a designated font "Gothic". A reference numeral 903 denotes a portion for describing information regarding a first page of the data portion. A tile of a first page is "map", and print data is stored in "http://www. can. co. jp/IAPrinting/93234343/Report_p1. xml". In step S314 of FIG. 3, by designating this path, print data of the first page can be obtained. Similarly, a reference numeral 904 denotes a portion for describing information regarding a second page of the data portion. A title of the second page is "price list", and print data is stored in "http://www. can. co. jp/IAPrinting/93234343/Report_p2. xml".

After the generation of the print data in step S311, the service server 103 first transmits the index portion to the FAX machine 101 (step S312). The FAX machine 101 analyzes the index portion, and displays page information based on a result of the analysis.

FIG. 10 shows an example of display when a content of the index portion is displayed on the display screen. A reference numeral 1001 denotes a screen depicted on the display unit of the FAX machine 101. Upon reception of the index portion, the FAX machine 101 takes out page information from the index portion, and displays a list of title values provided to each page information as shown. If there is no title given, only the number of pages may be displayed.

The user checks the number of pages to be printed or simple explanation of each page as a displayed content, and a print content, and continues work of printing. The printing may even be cancelled during this checking. Also, by checking the print content, a page to be printed may be designated.

After having been instructed for printing, the FAX machine 101 sends a request of print data portion transmission to the service server 103 (step S314). In this case, when a predetermined page is designated, a request of transmission of a print data portion corresponding to the designated page is sent.

The service server 103 receives the transmission request (step S315), and returns a data portion (step S316). The FAX machine 101 receives the data portion, and executes printing base on the print data thereof (step S317).

Accordingly, when all the printings are completed, a series of steps are finished. When not all the printings are completed, the process returns to step S314, and printing is continued (step S318).

In the foregoing embodiment, after the index portion was sent in step S312, the data portion was sent in step S316. However, the index portion and the data portion may be simultaneously sent from the service server 103 to the FAX machine 101. In such a case, the FAX machine 101 first receives the index portion and the data portion, and executes displaying as shown in FIG. 10 based on a content of the index portion. The data portion corresponding to a page designated by the user in the display of FIG. 10 is processed, and printed.

In the foregoing embodiment, the number of FAX machines was only one. However, other FAX machines, cellular phones and information portable terminals can communicate with the service server and, by executing processing shown in FIG. 3 with these units, services can be received.

In the foregoing embodiment, the number of FAX machines was only one. However, other FAX machines, cellular phones and information portable terminals can communicate with the service server and, by executing processing shown in FIG. 3 with these units, services can be receives.

In the foregoing embodiment, for example if a conversion module is present in the content server 107, an arrangement may be made to prevent the service server 103 from receiving a request of a print content from the FAX machine 101, and instead enable the content server 107 to directly receive the request of the print content. Similarly, if a conversion module is present in the Web server 113 on the Internet, the Web server 113 can receive the request.

The print content may be a homepage described in HTML to be read by a PC, or a document file described in an XML form. At the conversion module, processing corresponding to an equipment for printing can be carried out, and information conversion may be carried out without losing any content information.

As described above, according to the present invention, when the user selects the link to the print content, the FAX machine can execute printing without displaying the print content, and print a content prepared beforehand for printing clearly and in high detail.

By using the FAX machine installed at home, contents that have been obtained only by a personal computer can be read and obtained through a print medium. In addition, print data converted from the print content includes an index portion and a data portion. By the index portion, the contents of various contents can be supplied as a list, and the user can obtain only necessary information.

Further, it is possible to provide not only a content to be displayed on the Internet but also a content specified for printing use. Thus, the user can easily obtain even prints, such as advertising catalogs or coupons, which necessitated the user to wait for delivery.

Furthermore, it is possible to widen business fields in such printing or print services on the Internet.

Hereinafter, description is made of processing to be carried out when a data portion of a given print content further contains link information.

Figure 13:
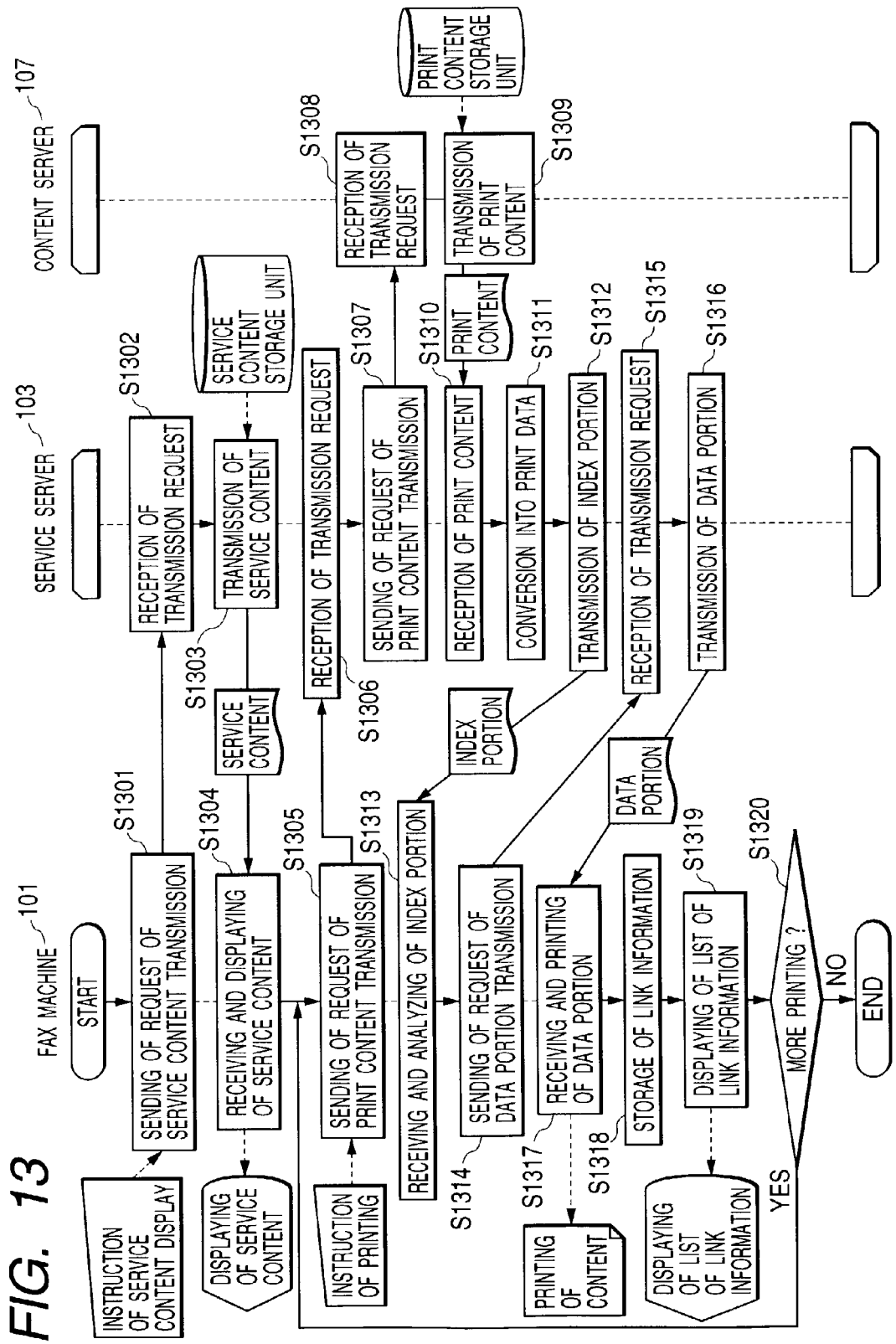
FIG. 13 is a flowchart showing processing carried out by each of the FAX machine, the service server, and the content server.

FIG. 13 is a flowchart showing processing carried out by each of the FAX machine 101, the service server 103, and the content server 107. An operation of the present invention will be described with reference to the drawing.

In FIG. 13, steps S1301, S1304, S1305, S1313, S1314, S1317, and S1318 are executed by the FAX machine 101. Steps S1302, S1303, S1306, S1307, S1310, S1311, S1312, S1315, and S1316 are executed by the service server 103. Steps S1308 and S1309 are executed by the content server 107.

First, when a user instructs starting of services, the FAX machine 101 connects with the service server 103, and then sends a request of service content transmission to the service server 103 (step S1301). Upon reception of the transmission request from the FAX machine 101 (step S1302), the service server 103 obtains a service content from the service content storage unit 104, and transmits the service content to the FAX machine 101 (step S1303).

Upon reception of the service content, the FAX machine 101 displays a content of the service content (step S1304). In this case, the FAX machine 101 analyzes the service content, and displays an image or a character on the display unit according to the content described therein.

FIG. 4 is a view showing an example of display based on, for example a service content described in HTML.

The FAX machine determines which of a service content and a print content is to be requested according to a described content. For example, in the case of FIG. 6, a link to a print content is determined according to a description of "printto", and a print content is requested. In the case of FIG. 7, a link to a print content is determined according to a description of "media="printto"".

In this case, if the user selects or designates a link on a display, the FAX machine determines whether the selected link or selected URL is a link to a print content or not. If the link to the print content is determined, a designated print content is requested to the service server 103 (step S1305).

For selection or designation of a link, the user depresses left-and-right and up-and-down arrow keys 53a, 53b, 53c and 53d, selects one indicating a link on the display screen of the display unit 15, and decides it by depressing a setting key 54. For example, by depressing the left-and-right arrow keys 53a, 53b, 53c and 53d, ones indicating links may be moved one after another, and a link to be selected may be decided by depressing the setting key 54.

In this case, in order to verify the intention of printing again, the FAX machine 101 may issue a message such as "IS PRINTING EXECUTED?". If a link to a service content is determined, the process returns to step S1301, where a service content is requested to the service server 103.

In addition to clicking of the link to the print content, a print content corresponding to a service content may be requested by depressing a print instruction button. In this case, at a point of time when the print instruction button is depressed, an input screen for entering URL of the print content is displayed. The user enters URL of the print content in a circle of the entry.

When the FAX machine 101 requests a print content, the service server 103 receives a transmission request of the print content (step S1306), and requests the print content to the content server 107 when it determines that the requested print content is present in the content server 107 (step S1307).

The content server 103 receives the transmission request (step S1308), and reads the requested print content from the print content storage unit 109 and transmits it (step S1309).

The service server 103 converts the received print content into print data to be printed by the FAX machine (step S1311). The converted print data is expressed, for example in extensible markup language (XML), and composed of an index portion having a page constitution of a print or simple explanation of each page, and a data portion indicating a content of the print. The data after convention may be described as a plurality of files.

FIG. 8 is an explanatory view showing the foregoing print data.

After the print data is generated in step S1311, the service server 103 first transmits the index portion to the FAX machine 101 (step S1312). The FAX machine 101 analyzes the index portion, and displays page information based on a result of the analysis.

When printing is instructed, the FAX machine 101 transmits a transmission request of a print data portion to the service sever 103 (step S1314). In this case, if a predetermined page is designated, a request of transmission of a print data portion corresponding to the designated page is transmitted.

The service server 103 receives the transmission request (step S1315), and returns a data portion (step S1316). The FAX machine 101 receives the data portion, and executes printing based on the print data (step S1317).

Further, the FAX machine 101 analyzes the received data portion, takes out link information such as URL contained therein, and stores it in the memory (step S 1318). Then, when the printing carried out in step S1317 is completed, a list of the stored link information (title of a print content of a linked site, URL of the linked site and the like) is displayed on the display unit (step S1319).

FIG. 14 is a view showing an example of link information of a print content. A reference numeral 1401 denotes a data portion of print data. If a link tag appears in the data portion described in an XHTML form, determining a further linked print content, its link character string and URL of a linked site are stored so as to be displayed in a list. In FIG. 14, in descriptions of 1402 and 1403, two more print contents are linked.

FIG. 15 is a view showing an example of a list of link information. A reference numeral 1501 denotes a screen of the FAX machine 101, and 1502 a dialog to be displayed when printing is completed. As shown, if another link to the print content is present in accordance with a checking dialogue of printing completion, a list is displayed to enable the user to select printing of even the linked site.

Regarding the selection, the linked site may be directly selected by using an arrow key, or by adding a number to each link information displayed in a list, and by a dial button of the FAX machine based on numerals. A shortcut operation may be allocated to instruct printing. Further, on the link portion of a printing result, by printing an allocated number in a balloon or comment form, a similar shortcut number may be conveyed to the FAX user.

Accordingly, the FAX machine 101 determines which linked site has been selected on the screen of FIG. 15 (step S1320). When selection of any one of linked sites is determined, to execute further printing, the process returns to step S1305, where a print content of the selected linked site is requested.

In the foregoing, after the sending of the index portion in step S1312, the data portion was sent in step S1316. However, the index portion and the data portion may be simultaneously sent from the service server 103 to the FAX machine 101. In this case, the FAX machine 101 first receives the index portion and the data portion, and executes displaying of FIG. 15 based on a content of the index portion. Then, on the displaying of FIG. 15, the data portion corresponding to a page designated by the user is processed, and printing is executed.

In the foregoing, explanation was made assuming that the number of FAX machines was only one. Other FAX machines, cellular phones and information portable terminals can communicate with the service server, and these can receive services by executing processing of FIG. 13.

In the foregoing, for example if a conversion module is present in the content server 107, the service server 103 does not receive the request of the print content from the FAX machine 101, but the content server 107 can directly receive the request of the print content. Similarly, if a conversion module is present in the Web server 113 on the Internet, the Web server 113 can receive the request.

The print content may be a homepage described in HTML to be read by a PC, or a document file described in an XML form. At the conversion module, processing matching a device for printing can also be carried out, and information conversion may be executed without losing information of its content.

According to the present invention, by using the FAX machine installed at home, contents that have been obtained only by the personal computer can be read/obtained. Moreover, the print data converted form the print content is composed of the index portion and the data portion and, by the index portion, contents of various contents can be supplied in a list. The user can obtain only necessary information.

Not only the content to be displayed on the Internet but also contents specialized for printing can be supplied to the user. The user can easily obtain even prints, such as catalogues or coupons, which necessitate the user to wait for delivery.

Especially, by enabling a hyper link to the print content to be further described in print data or printing markup language, data of linked sites can be continuously printed. Thus, to print a series of print contents, it is not necessary for the user to enter URL many times, obtain a display content again and issue printing instruction therefrom. The user can easily instruct continuous printing of related data.

A program and related data of the present invention are stored in a floppy disk (FD) or a CD-ROM, and supplied to computers therefrom. The object of the invention is achieved by supplying a storage medium recording a program code (e.g., program code corresponding to each step in FIG. 3) of software (control program) for realizing the function of the foregoing embodiment to the computer, and reading and executing the program code stored in the storage medium at the device (e.g., CPU 10) of the computer.

As a method of supplying the software or the data to the computer, a method of storing in the floppy disk FD, and supplying it to the computer main body (through floppy disk drive or the like) has generally been used. In this case, the program code itself read from the storage medium realizes the function of the foregoing embodiment, and the storage medium that has stored the program code constitutes the present invention.

As a storage medium for supplying the program code, other than the floppy disk or a hard disk, for example, an optical disk, a magnet-optical disk, a CD-ROM, a CD-R, a magnetic tape, a nonvolatile memory card, ROM or the like can be used. Needless to say, by the execution of the read program code at the computer, a part or all of actual processing may be executed by an operating system (OS) operating on the computer based on instruction of the program code, and the function of the foregoing embodiment may be realized by this processing, which is also within the present invention. Moreover, the program code read from the storage medium may be written in a memory provided in a function expansion board inserted into the computer or a function expansion unit connected to the computer and, then, based on instruction of the program code, a part or all of actual processing may be executed by a CPU or the like provided in the function expansion board or the function expansion unit, thereby realizing the function of the foregoing embodiment, which is also within the present invention.

What is claimed is:

1. An online print system including a server apparatus and a print apparatus capable of communicating with said server apparatus via the Internet, said print apparatus comprising:

first receiving means for receiving display page data from said server apparatus;

analyzing means for analyzing the display page data received by said receiving means to display the display page data on a display; and requesting means for requesting said server apparatus to print the display page data, in accordance with link information included in the display page data, when the result of the analyzing indicates that the display page data includes the link information, and said server apparatus comprising:

obtaining means for obtaining print page data based on the request from said print apparatus;

forming means for forming an index file including information indicating outlines of respective pages of the print page data; and transmitting means for transmitting the index file formed by said forming means to said print apparatus, wherein said print apparatus further comprises:

second receiving means for receiving the index file together with the print page data from said server apparatus;

display means for displaying on the display the index file received by said second receiving means designating means for designating a page to be subjected to printing, on the basis of the displayed index file; and printing means for printing the page designated by said designating means, on the basis of the print page data.

2. A server apparatus capable of communicating with a print apparatus via the Internet, comprising:

transmitting means for transmitting display page data to said print apparatus;

receiving means for receiving a print request transmitted in accordance with link information included in the display page data, from said print apparatus;

obtaining means for obtaining print page data in accordance with the print request received by said receiving means;

forming means for forming an index file including information indicating outlines of respective pages of the print page data; and transmitting means for transmitting the index file formed by said forming means and print page data obtained by said obtaining means to said print apparatus, wherein said print apparatus effects printing so that a page designated based on an analysis result of the index file is printed in accordance with the print page data.

3. A server apparatus according to claim 2, wherein said obtaining means obtains the print page data from another server apparatus.

4. A server apparatus according to claim 2, further comprising converting means for converting the print data so that said print apparatus can print the converted print page data.

5. A print apparatus capable of communicating with a server apparatus via the Internet, comprising:

first receiving means for receiving display page data from said server apparatus;

analyzing means for analyzing the display page data received by said receiving means to display the display page data on a display;

requesting means for requesting said server apparatus to print the display page data, in accordance with link information included in the display page data, when the result of the analyzing indicates that the display page data includes the link information;

second receiving means for receiving, from said server apparatus together with print page data, an index file including information indicating outlines of respective pages of the print page data;

display means for displaying on the display the index file received by said second receiving means, and designating means for designating a page to be subjected to printing, on the basis of the displayed index file; and printing means for printing the page designated by said designating means, on the basis of the print page data.

6. A control method for a server apparatus capable of communicating with a print apparatus via the Internet, said control method comprising the steps of:

transmitting display page data to said print apparatus;

receiving a print request which is transmitted in accordance with link information included in the display page data, from said print apparatus;

obtaining print page data in accordance with the print request received in said receiving step;

forming an index file including information indicating outlines of respective pages of the print page data; and transmitting the index file formed in said index file forming step and the print page data obtained in said obtaining step to said print apparatus, wherein said print apparatus effects printing so that a page designated based on an analysis result of the index file is printed in accordance with the print page data.

7. A control method for a print apparatus capable of communicating with a server apparatus via the Internet, said control method comprising the steps of:

receiving display page data from said server apparatus;

analyzing the display page data received in said display page data receiving step to display the display page data on a display;

requesting said server apparatus to print the display page data, in accordance with link information included in the display page data, when the result of the analyzing indicates that the display page data includes the link information;

receiving, from said server apparatus together with print page data, an index file including information indicating outlines of respective pages of the print page data;

displaying on the display the index file received in said index file receiving means;

designating a page to be subjected to printing, on the basis of the displayed index file; and printing the page designated in said designating step, on the basis of the print page data.

8. A computer-readable storage medium storing a computer-executable program comprising program codes for causing a computer to execute a control method for a server apparatus capable of communicating with a print apparatus via the Internet, said control method comprising the steps of:

transmitting display page data to said print apparatus;

receiving a print request which is transmitted in accordance with link information included in the display page data, from said print apparatus;

obtaining print page data in accordance with the print request received in said print request receiving step;

forming an index file including information indicating outlines of respective pages of the print page data; and transmitting the index file formed in said index file forming step and the print page data obtained in said obtaining step to said print apparatus, wherein said print apparatus effects printing so that a page designated based on an analysis result of the index file is printed in accordance with the print page data.

9. A computer-readable storage medium storing a computer-executable program comprising program codes for causing a computer to execute a control method for a print apparatus capable of communicating with a server apparatus via the Internet, said control method comprising the steps of:

receiving display page data from said server apparatus;

analyzing the display page data received in said display page data receiving step to display the display page data on a display;

requesting said server apparatus to print the display page data, in accordance with link information included in the display page data, when the result of the analyzing indicates that the display page data includes the link information;

receiving, from said server apparatus together with print page data, an index file including information indicating outlines of respective pages of the print page data;

displaying on the display the index file received in said index file receiving step;

designating a page to be subjected to printing, on the basis of the displayed index file; and printing the page designated in said designating step, on the basis of the print page data.

* * * * *

UNITED STATES PATENT AND TRADEMARK OFFICE
CERTIFICATE OF CORRECTION

PATENT NO. : 7,321,439 B2  Page 1 of 1
APPLICATION NO. : 10/184937
DATED : January 22, 2008
INVENTOR(S) : Takagi et al.

It is certified that error appears in the above-identified patent and that said Letters Patent is hereby corrected as shown below:

COLUMN 1:
Line 55, "side" should read -- site --.

COLUMN 3:
Line 6, "equipments" should read -- equipment --.

COLUMN 6:
Line 11, "tile" should read -- title --; and
Line 49, "base" should read -- based --.

COLUMN 7:
Line 39, "necessitated" should read -- necessitates --.

COLUMN 9:
Line 22, "dialog" should read -- dialogue --.

COLUMN 11:
Line 23, "means" should read -- means; --.

Signed and Sealed this

Twenty-sixth Day of August, 2008

JON W. DUDAS
*Director of the United States Patent and Trademark Office*